United States Patent
Lee et al.

(10) Patent No.: US 10,785,544 B2
(45) Date of Patent: Sep. 22, 2020

(54) IMAGE ACQUISITION APPARATUS WITH PRIORITY NETWORK SELECTION FOR DATA UPLOAD

(71) Applicant: Hanwha Techwin Co., Ltd., Seongnam-si (KR)

(72) Inventors: Joon Sung Lee, Seongnam-si (KR); Min Suk Sung, Seongnam-si (KR); Dong Seong Kim, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 16/336,230

(22) PCT Filed: Oct. 11, 2016

(86) PCT No.: PCT/KR2016/011338
§ 371 (c)(1),
(2) Date: Mar. 25, 2019

(87) PCT Pub. No.: WO2018/070557
PCT Pub. Date: Apr. 19, 2018

(65) Prior Publication Data
US 2019/0281363 A1    Sep. 12, 2019

(30) Foreign Application Priority Data

Oct. 10, 2016  (KR) ................. 10-2016-0130825

(51) Int. Cl.
*H04W 72/10* (2009.01)
*H04W 4/029* (2018.01)
(Continued)

(52) U.S. Cl.
CPC ........... *H04N 21/6181* (2013.01); *H04N 5/76* (2013.01); *H04N 5/77* (2013.01); *H04N 21/2743* (2013.01);
(Continued)

(58) Field of Classification Search
CPC ....... H04W 28/02; H04W 48/18; H04W 4/02; H04W 72/10; H04W 88/06; H04W 4/029;
(Continued)

(56) References Cited

U.S. PATENT DOCUMENTS 6,496,949 B1   12/2002   Kanevsky et al.
6,564,380 B1   5/2003    Murphy
(Continued)

FOREIGN PATENT DOCUMENTS

JP   2012-90150 A    5/2012
JP   2012-109790 A   6/2012
(Continued)

OTHER PUBLICATIONS

International Search Report dated Jul. 7, 2017 by the International Searching Authority in counterpart International Patent Application No. PCT/KR2016/011338. (PCT/ISA/210).
(Continued)

*Primary Examiner* — Philip Sobutka
(74) *Attorney, Agent, or Firm* — Sughrue Mion, PLLC

(57) ABSTRACT

Provided is an image acquisition apparatus according to an embodiment of the disclosure for performing wireless Internet communication. The image acquisition apparatus stores a service set identifier (SSID) of a specific access point, stores in a memory files of a video, which are acquired by photographing, and uploads the files, which are stored in the memory, to a monitoring device through the specific access point when the SSID is detected.

14 Claims, 9 Drawing Sheets

(51) Int. Cl.
*H04N 21/61* (2011.01)
*H04N 5/77* (2006.01)
*H04W 48/18* (2009.01)
*H04W 88/06* (2009.01)
*H04N 21/414* (2011.01)
*H04N 5/76* (2006.01)
*H04N 21/2743* (2011.01)
*H04W 28/02* (2009.01)
*H04N 21/4223* (2011.01)
*H04N 21/44* (2011.01)
*H04W 4/02* (2018.01)

(52) U.S. Cl.
CPC ... *H04N 21/41407* (2013.01); *H04N 21/4223* (2013.01); *H04N 21/44008* (2013.01); *H04N 21/61* (2013.01); *H04W 28/02* (2013.01); *H04W 48/18* (2013.01); *H04W 72/10* (2013.01); *H04W 88/06* (2013.01); *H04W 4/02* (2013.01)

(58) Field of Classification Search
CPC .. H04W 88/02; H04W 4/025; H04N 21/2743; H04N 21/41407; H04N 21/4223; H04N 21/44008; H04N 21/61; H04N 21/6181; H04N 5/76; H04N 5/77; G08B 13/19656; G08B 13/1966; G08B 13/19669
USPC ............... 455/456.1, 435.1, 435.2, 435.3
See application file for complete search history.

(56) References Cited

U.S. PATENT DOCUMENTS

| | | |
|---|---|---|
| 9,144,097 B2 | 9/2015 | Kao et al. |
| 2003/0184793 A1 | 10/2003 | Pineau |
| 2014/0018097 A1* | 1/2014 | Goldstein ............... G06F 19/00 455/456.1 |
| 2015/0358838 A1 | 12/2015 | Wei et al. |
| 2016/0100090 A1* | 4/2016 | Konicek ............... G03B 17/02 |

FOREIGN PATENT DOCUMENTS

| | | |
|---|---|---|
| JP | 5787092 B2 | 9/2015 |
| JP | 2016-85752 A | 5/2016 |
| KR | 10-2010-0102362 A | 9/2010 |
| KR | 10-2012-0014751 A | 2/2012 |
| KR | 10-2015-0080530 A | 7/2015 |
| KR | 10-2015-0133993 A | 12/2015 |
| WO | 2014/066403 A1 | 5/2014 |

OTHER PUBLICATIONS

Written Opinion dated Jul. 7, 2017 by the International Searching Authority inc ounterpart International Patent Application No. PCT/KR2016/011338. (PCT/ISA/237).

\* cited by examiner

| DATE | TIME | DETAILS OF EVENTS |
|---|---|---|
| 2016/01/17 | 00:05:10 | GUNSHOT IS DETECTED |
| ... | 00:45:01 | FACIAL IMAGE OF WANTED IS DETECTED |
| ... | 00:46:37 | GUN IMAGE IS DETECTED |
| ⋮ | ⋮ | ⋮ | ized
IMAGE ACQUISITION APPARATUS WITH PRIORITY NETWORK SELECTION FOR DATA UPLOAD

TECHNICAL FIELD

The present disclosure relates to an image acquisition apparatus and a method of driving the same.

BACKGROUND ART

In general, wearable cameras worn by users capture front images of the users and store, in memory, files of videos that are obtained by photographing. Then, the users need to back up the files stored in the memory to host devices.

However, the aforementioned background art has been drawn to the disclosure of the present inventors, or as technical information derived from the acquisition process of the disclosure, it is not necessarily be as well-known techniques open to the general public before the filing of the disclosure.

DESCRIPTION OF EMBODIMENTS

Technical Problem

Provided is an image acquisition apparatus capable of appropriately uploading files of a video to a host device without the manipulation of a user.

Solution to Problem

According to an aspect of the present disclosure, an image acquisition apparatus includes: a sensor unit configured to generate a detection signal; a log generator configured to detect an event corresponding to a keyword that is set in response to the detection signal, and generate a log file regarding the event; a storage configured to store the detection signal and the log file; and a mode controller configured to, when the image acquisition apparatus accesses a specific area, select a network according to a priority that is set for at least one accessible network, and upload, to an external device, data including at least one of the detection signal and the log file through the selected network.

The detection signal may include a sound signal and an image signal.

The controller may be further configured to differently set the data to be uploaded according to the priority of the network.

The controller may be further configured to differently set upload capacity of the data stored in the storage, according to the priority of the network.

When a plurality of network access devices are retrieved from the selected network, the controller may be further configured to access a first access device corresponding to a registered identifier.

When the first access device is not retrieved and when a remaining capacity of the storage is less than a minimum capacity, the controller may be further configured to access a plurality of access devices other than the first access device, based on signal intensity.

A first priority network may be a Wireless Fidelity (Wi-Fi) network, and a second priority network may be a Long Term Evolution (LTE) network.

When the access to the first priority network and the second priority network fails, the mode controller may be configured to perform a direct wireless access to another device.

The other device may include a device connected to the first priority network or the second priority network.

According to another aspect of the present disclosure, a method of driving an image acquisition apparatus, includes: generating a detection signal; detecting an event corresponding to a keyword that is set in response to the detection signal and generating a log file regarding the event; storing the detection signal and the log file; and uploading, to an external device, data including at least one of the detection signal and the log file through a network that is selected according to a priority that is set for at least one accessible network when the image acquisition apparatus accesses a specific area.

The detection signal may include a sound signal and an image signal.

The data to be uploaded may include pieces that are different according to the priority of the network.

The capacity of the data to be uploaded may be different according to the priority of the network.

When a plurality of network access devices are retrieved from the selected network, the uploading may include performing access to a first access device corresponding to a registered identifier.

When the first access device is not retrieved and remaining capacity of the storage is less than minimum capacity, the uploading may include performing an access to one of the plurality of access devices other than the first access device, based on signal intensity.

A first priority network is a Wi-Fi network, and a second priority network is an LTE network.

When the access to the first priority network and the second priority network fails, the uploading may include a direct wireless access to another device.

The other devices may include devices connected to the first priority network or the second priority network.

According to another aspect of the present disclosure, a method of monitoring a system includes: receiving data including at least one of a detection signal and a log file regarding an event corresponding to a keyword that is set in response to the detection signal, through a network selected according to a priority that is set for at least one accessible network, wherein the network is selected from a wearable camera in a specific area; and displaying an event list based on the log file during the reception of the data.

Advantageous Effects of Disclosure

According to an image acquisition apparatus according to one or more embodiments, when a user accesses a Wi-Fi zone at a specific access point, that is, a specific Wi-Fi zone, files stored in a memory are automatically uploaded to a monitoring device.

That is, the image acquisition apparatus of the disclosure detects that a user accesses a location of the monitoring device by using a Service Set Identifier (SSID) of the specific access point and backs up the files from a detection point in time. Therefore, a backup of the files may be automatically performed at an appropriate point in time that the user desires.

BEST MODE

Figure 1:
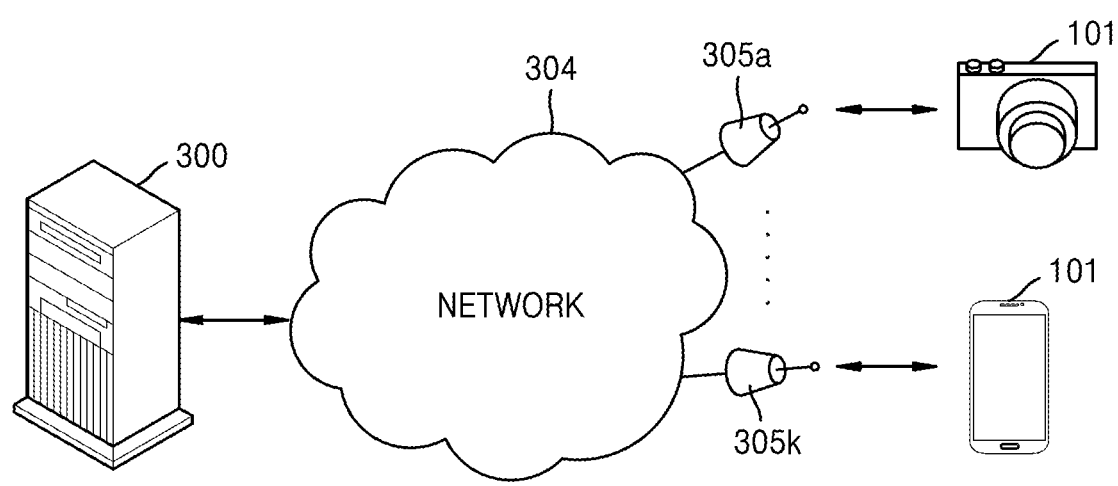
FIG. 1 is a schematic diagram of an image transmission system according to an embodiment of the disclosure.

An image acquisition apparatus according to an embodiment of the disclosure includes: a sensor unit configured to generate a detection signal; a log generator configured to detect an event corresponding to a keyword that is set in response to the detection signal and to generate a log file regarding the event; a storage configured to store the detection signal and the log file; and a mode controller configured to, when a user accesses a specific area, select a network according to a priority that is set for at least one accessible network and upload, to an external device, data including at least one of the detection signal and the log file through the selected network.

MODE OF DISCLOSURE

As the disclosure allows for various changes and numerous embodiments, particular embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure. In the description of the disclosure, certain detailed explanations of the related art are omitted when it is deemed that they may unnecessarily obscure the essence of the disclosure.

While such terms as "first", "second", etc., may be used to describe various components, such components must not be limited to the above terms. The above terms are used only to distinguish one component from another.

The terms used in the present specification are merely used to describe particular embodiments, and are not intended to limit the disclosure. An expression used in the singular encompasses the expression of the plural, unless it has a clearly different meaning in the context. In the present specification, it is to be understood that the terms such as "including", "having", and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The disclosure may be described in terms of functional block components and various processing steps. Such functional blocks may be realized by any number of hardware and/or software components configured to perform the specified functions. For example, the disclosure may employ various integrated circuit (IC) components, e.g., memory elements, processing elements, logic elements, look-up tables, and the like, which may carry out a variety of functions under the control of one or more microprocessors or other control devices. Similarly, where the elements of the disclosure are implemented using software programming or software elements, the disclosure may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the disclosure could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

Hereinafter, one or more embodiments will be described with reference to the attached drawings.

FIG. 1 is a schematic diagram of an image transmission system according to an embodiment.

Referring to FIG. 1, the image transmission system according to an embodiment of the disclosure includes image acquisition apparatuses 101 and a monitoring device 300, and the image acquisition apparatuses 101 may be connected to the monitoring device 300 through a communication network 304.

The image acquisition apparatuses 101 may be connected to the communication network 304 of a different type through wireless access devices 305 (that is, wireless communication devices 305*a* and 305*k*) (hereinafter, referred to as 'access devices'). The communication network 304 may include a network such as $3^{rd}$ generation (3G), 4G (LTE), Wi-Fi, WiBro, or WiMAX. Hereinafter, for convenience of explanation, the image acquisition apparatuses 101 selectively access (communication connection) a heterogeneous network of a Wi-Fi network and an LTE network.

The access device 305 may include an access point (AP) supporting a Wi-Fi communication method, a wireless base station supporting an LTE communication method, or the like.

The image acquisition apparatus 101 may acquire images by capturing images of the surroundings of a user in real time and may upload the acquired images to the monitoring device 300. The image acquisition apparatus 101 may be a camera, a low-power camera of a battery type, or a wearable electronic device such as a handheld device.

The image acquisition apparatus 101 may set priorities to access heterogeneous communication networks that are accessible. The image acquisition apparatus 101 may set an access priority of the Wi-Fi network to be greater than an access priority of the LTE network. The image acquisition apparatus 101 may select a network according to the priority. The image acquisition apparatus 101 may access the access device 305 of the selected network and may upload, to the monitoring device 300, images and/or event log files generated according to the image analysis by using the accessed access device 305. The image acquisition apparatus 101 may store an identifier of a specific access device in advance, and when the user accesses a specific area and the identifier is detected, the image acquisition apparatus 101 may automatically access the specific access device and upload the stored images and/or event log files to the monitoring device 300. The specific area may be changed by the user.

The monitoring device 300 may receive and store images and/or event log files that are input from the image acquisition apparatus 101. The monitoring device 300 may be a terminal such as a personal computer, a smart phone, a tablet computer, or a handheld device, or a server such as a cloud server, a recording server, an upgrade server, or an alarm server.

The monitoring device 300 may receive the images and/or the event log files, which are input from the image acquisition apparatus 101, and may create an event list based on the log files. The monitoring device 300 may display the created event list on a monitor screen in real time. In this case, when a set alarm event is in the events on the event list, the monitoring device 300 may generate an alarm along with the display of the event list.

Figure 2:
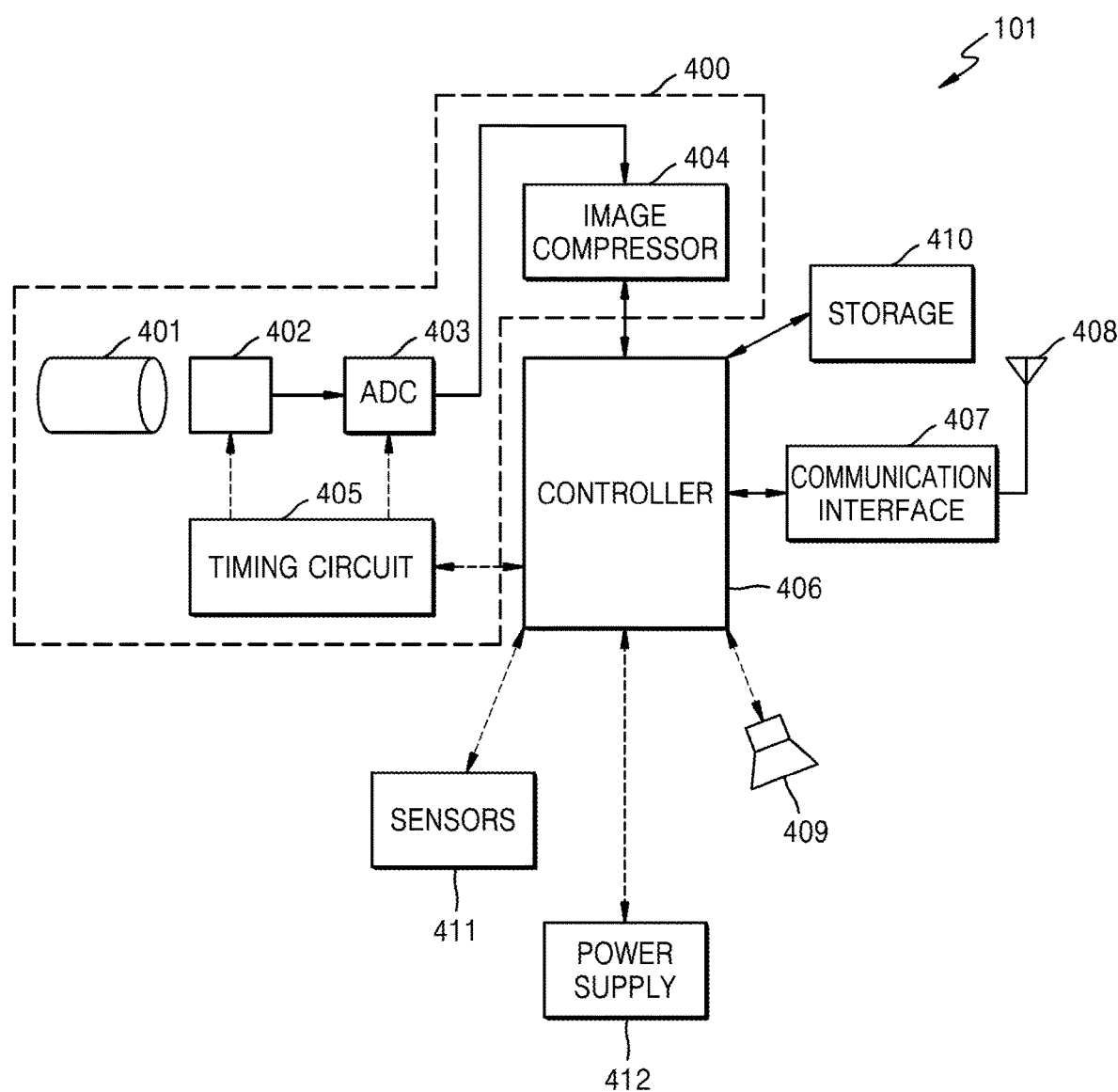
FIG. 2 is a block diagram of an internal structure of an image acquisition apparatus, according an embodiment of the disclosure.
Figures 3, 4:
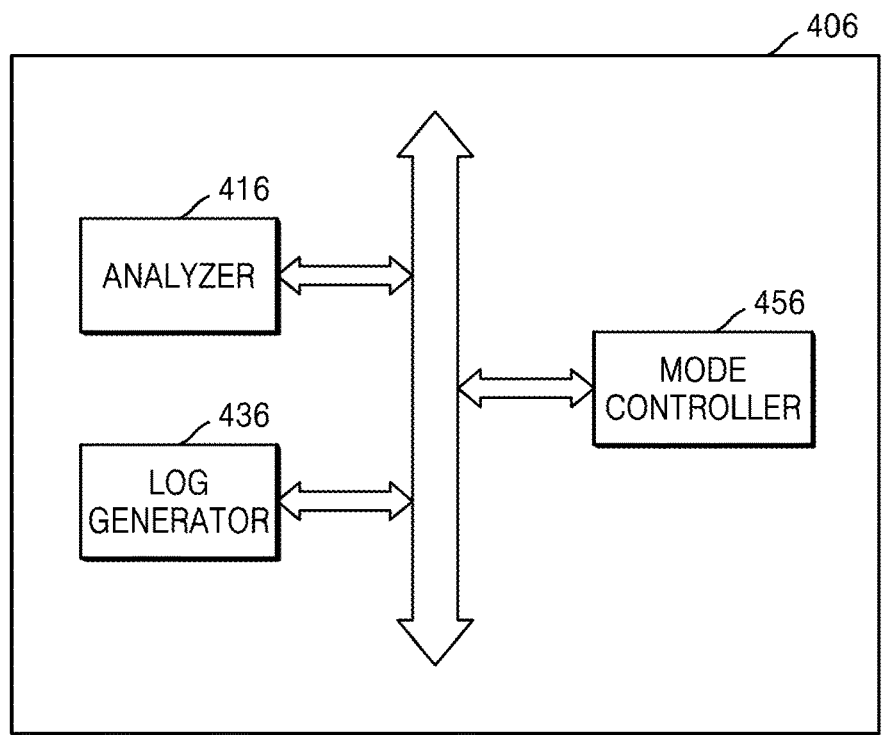
FIG. 3 is a schematic block diagram of an internal structure of a controller.
FIG. 4 shows an example of an event log stored in a storage.

FIG. 2 is a block diagram of an internal structure of the image acquisition apparatus, according an embodiment of the disclosure. FIG. 3 is a schematic block diagram of an internal structure of a controller.

The image acquisition apparatus 101 may include an image obtainer 400, a controller 406, a speaker 409, a flash memory 410, sensors 411, and a power supply 412.

The sensors 411 are heterogeneous sensors that acquire different pieces of detection information. For example, the sensors 411 may include a gyro sensor, a geomagnetic sensor, an acceleration sensor, a pyroelectric infrared ray (PIR) sensor, an impact sensor, a sound sensor, an olfactory sensor, a temperature sensor, a humidity sensor, and the like. The sensors 411 may have priorities, and thus the image acquisition apparatus 101 may receive detection information according to a priority of each sensor.

The image obtainer 400 may include an optical system 401, a photoelectric converter 402, an analog-to-digital converter (ADC) 403, an image compressor 404, and a timing circuit 405.

The optical system 401 may optically process light emitted from a photographing area. The optical system 401 may include a lens unit and a filter unit.

The photoelectric converter 402 may receive an optical signal that is input from the optical system 401 and may convert the received optical signal into electrical image data. The photoelectric converter 402 may be an image sensor including an imaging device such as a charge-coupled device (CCD) or a complementary metal-oxide-semiconductor (CMOS). The photoelectric converter 402 may output analog image data or digital image data according to characteristics of the imaging device.

The ADC 403 may convert the analog image data that is from the photoelectric converter 402 into the digital image data. The controller 406 controls the timing circuit 405 to control the operation of the photoelectric converter 402 and the ADC 403. The ADC 403 may not be included depending on the characteristics of the imaging device.

The image compressor 404 may compress the digital image data and may output, to the controller 406, data of a video that is a compression result. The controller 406 may store in the storage 410 files of the video that is the compression result.

The storage 410 may store programs for processing and controlling the controller 406 and may store data (e.g., a video, etc.) input or output. The storage 410 may store at least one event keyword according to a user input. The event keyword may be text, sound, an image, or the like. For example, the event keyword may be "a gunshot", "a gun image", "a facial image of a wanted", or the like. The storage 410 may store an identifier of a specific access device. The identifier may be a service set identifier (SSID) of the specific access point of a Wi-Fi network.

The storage 410 may include a storage medium of at least one type selected from among a flash memory type, a hard disk type, a multimedia card micro type, a card type (e.g., an SD type, an XD memory type, or the like), random access memory (RAM), and read only memory (ROM).

A communication interface 407 may provide a communication using a wired communication and/or a wireless communication link. The communication interface 407 may include a communication module capable of performing Wi-Fi, 3G, LTE, and/or radio frequency (RF), and/or Bluetooth, or an arbitrary communication technique. The communication interface 407 may include an antenna 408 according to the communication module.

The power supply 412 may receive external power and/or internal power under the control of the controller 406 and supply power necessary to drive each component. The power supply 412 may include a rechargeable battery.

The controller 406 may control all operations of the image acquisition apparatus 100 and may exchange control signals with the components to control the operation of the components, or may perform a function of processing data, etc. The controller 406 may be realized as a microchip or a circuit board including the microchip, and each component included in the controller 406 may be realized by software or circuits embedded in the controller 406. For example, the controller 406 may include an application processor (AP), a micro controller chip (MCU), and the like. The controller 406 may include an analyser 416, a log generator 436, and the mode controller 456.

The analyser 416 may analyse various detection signals including image signals output by the image obtainer 400 and the sensors 411.

The log generator 436 may generate an event log when an event matching with an event keyword stored in the storage 410 occurs as a result of analysing the detection signals and may store the event log in the storage 410. The event log may include a sensor ID, an event occurrence date, an event occurrence time, a duration, event details (descriptions), an event occurrence location and/or area in an image, and the like. For example, the log generator 436 may analyse a video acquired by photographing, may generate the event log when the event corresponding to the stored event keyword occurs, and may store the event log in the storage 410. The log generator 436 may include reference information corresponding to the event keyword. The log generator 436 may update a file of an event log whenever an event occurs. Accordingly, details of the event may be identified fast, and a file of a video including the event may be easily retrieved.

FIG. 4 shows an example of an event log stored in a storage. The event log 601 of FIG. 4 includes an event occurrence date, an event occurrence time, and event details.

When the image acquisition apparatus 101 accesses a specific area, the mode controller 456 may set a first mode, a second mode, and a third mode according to network access priorities. The first mode may be a Wi-Fi network access mode. The second mode may be an LTE network access mode. The third mode may be a direct access mode in which the image acquisition apparatus 101 directly connects a neighboring terminal device. The neighboring terminal device may be a terminal device connected to a Wi-Fi network or an LTE network. The neighboring terminal device may be a terminal device having a near-field wireless communication function using a wireless frequency band such as Bluetooth or RF. The neighboring terminal device may be another image acquisition apparatus, for example, a camera, a low-power camera of a battery type, a wearable electronic device such as a handheld device, or the like. The neighboring terminal device may be an Internet of Things (IoT) terminal device such as a navigation device or a black box.

The mode of the mode controller 456 is changed to the first mode when it is detected that the image acquisition apparatus 101 accesses a specific area, and the mode controller 456 may be connected to the Wi-Fi network by accessing the specific access device when the specific access device, for example, an SSID of the specific access point is detected. The mode controller 456 may upload, to a monitoring device 300, files stored in the storage 410 through the specific access point. The mode controller 456 may upload both files of a video and log files stored in the storage 410 to the monitoring device 300. The mode controller 456 may delete or retain the uploaded files.

When the mode controller 456 fails to operate in the first mode, the mode of the mode controller 456 may be changed to the second mode. In the second mode, the mode controller 456 accesses an access device, for example, a wireless base station, and may be connected to the LTE network. The mode controller 456 may upload, to the monitoring device 300, the log files stored in the storage 410 through the wireless base station. The mode controller 456 may upload, to the monitoring device 300, part of a video, in which an event occurs, and some of the detection signals together with the log files. When there are no log files, that is, when no events occur, the mode controller 456 may upload part of the video stored in the storage 410 to the monitoring device 300 and may delete the part. A size of the file to be partially uploaded may be set as default or may be set by the user.

When the mode controller 456 fails to operate in the first mode and the second mode, the mode of the mode controller 456 may be changed to the third mode. In the third mode, the mode controller 456 directly accesses another terminal device and may directly upload the log files stored in the storage 410 to the other terminal device. The mode controller 456 may upload, to the other terminal device, the part of the video in which the event occurs and some of the detection signals together with the log files. When there are no log files, that is, when no events occur, the mode controller 456 may upload part of the video stored in the storage 410 to the monitoring device 300 and may delete the part. A size of the file to be partially uploaded may be set as default or may be set by the user.

In the above embodiment, the mode controller 456 sets the priorities sequentially to the first mode, the second mode, and the third mode. However, one or more embodiments of the disclosure are not limited thereto. The mode controller 456 may change the priorities of the first to third modes based on the configuration of the user. For example, when another terminal device registered in the image acquisition apparatus 101 is detected as the image acquisition apparatus 101 accesses the specific area, the mode of the mode controller 456 is changed to the third mode first, and the mode controller 456 may directly access the other terminal device to upload the data and may receive data from the other terminal device, thereby sharing the data with the other terminal device.

The controller 406 may output an event alarm and a guidance voice through the speaker 409. In the present embodiment, whenever the event log file is updated, the controller 406 may output details of a currently-occurring event as sound and may output, as sound, the number and names of files in which videos of accumulated videos are stored.

Figure 5:
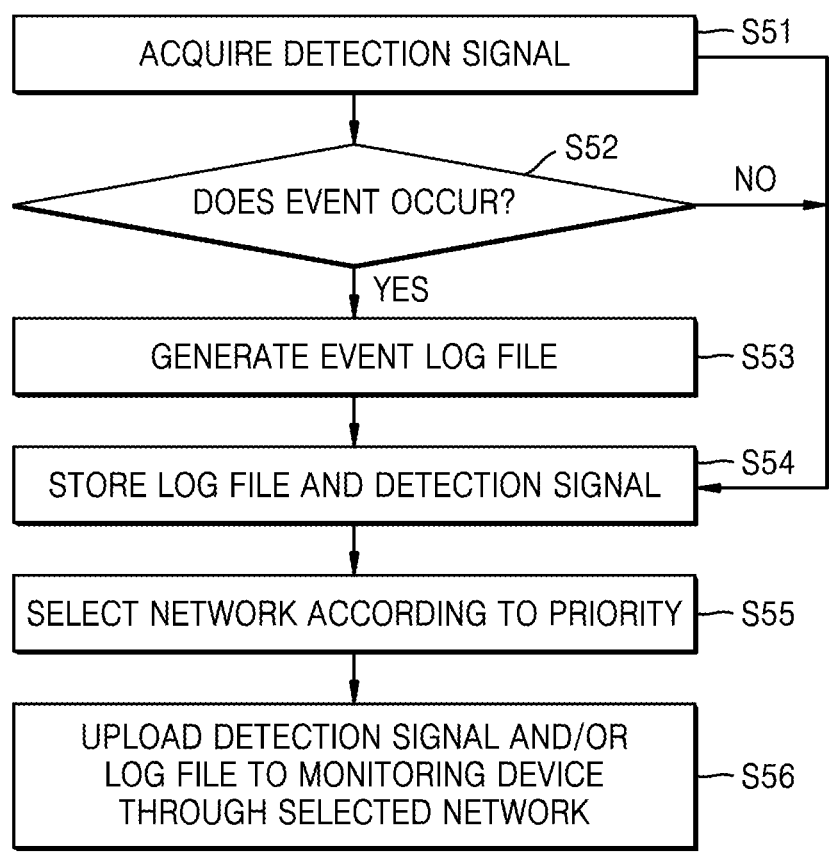
FIG. 5 is a flowchart of the operation of an image acquisition apparatus, according to an embodiment of the disclosure.

FIG. 5 is a flowchart of the operation of the image acquisition apparatus, according to an embodiment of the disclosure.

Referring to FIG. 5, in operation S51, the image acquisition apparatus 101 may acquire a detection signal from the image obtainer 400 and the sensors 411. The detection signal may include an image signal from the image obtainer 400, a sound signal from the sensors 411, an olfactory signal, or the like.

The image acquisition apparatus 101 may determine whether an event corresponding to an event keyword, which is set in response to the detection signal, occurs in operation S51 and when the event occurs, the image acquisition apparatus 101 may generate a log file by generating a log regarding the event, in operation S53.

In operation S54, the image acquisition apparatus 101 may store the detection signal and the event log file in the storage 410. The image acquisition apparatus 101 may update the log file of the storage 410 whenever an event log is generated.

When an access to a specific area is detected, the image acquisition apparatus 101 may select a network according to a network access priority in operation S55 and may upload the detection signal and the log file to the monitoring device 300 through the selected network in operation S56.

The image acquisition apparatus 101 may select the Wi-Fi network first and may operate in the first mode. The image acquisition apparatus 101 may retrieve an access point of the Wi-Fi network, and when an access point having a registered SSID is detected, an access to the detected access point may be performed. When the access point having the registered SSID is not detected, the image acquisition apparatus 101 may determine whether to access another access point according to the remaining capacity of the storage 410. When the remaining capacity of the storage 410 is equal to or greater than the minimum capacity, the image acquisition apparatus 101 may defer the upload until the access point having the registered SSID is detected. When the remaining capacity of the storage 410 is less than the minimum capacity, the image acquisition apparatus 101 may access an access point having the greatest intensity. The image acquisition apparatus 101 may upload the detection signal and the log file to the monitoring device 300 through the accessed access point.

When the access to the Wi-Fi network fails, the image acquisition apparatus 101 may select the LTE network and may operate in the second mode. The image acquisition apparatus 101 may access a wireless base station of the LTE network and may upload some of the files to the monitoring device 300 through the accessed wireless base station. The image acquisition apparatus 101 may upload only a detection signal and/or a log file, which include the event from among detection signals, to the monitoring device 300.

When the access to the LTE network fails, the image acquisition apparatus 101 may operate in the third mode in which a direct access to another terminal device is available. The image acquisition apparatus 101 may access a neighboring terminal device. When one or more terminal devices are detected, the image acquisition apparatus 101 may select other terminal devices according to priorities of the terminal devices. The image acquisition apparatus 101 may upload some of the files to the monitoring device 300 through the accessed terminal device. The image acquisition apparatus

101 may upload only a detection signal and/or a log file, which include the event from among detection signals, to the monitoring device 300.

Figure 6:
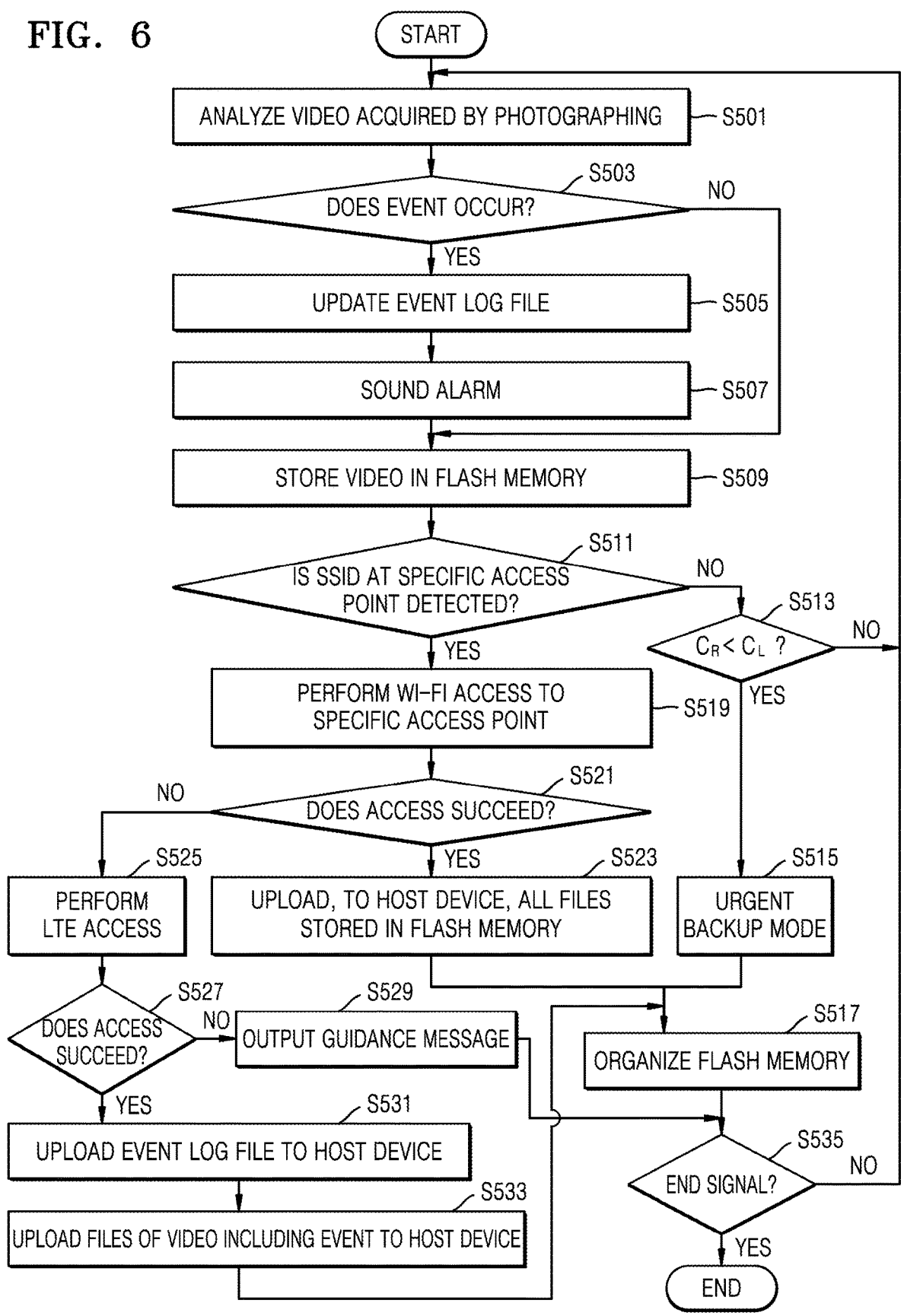
FIG. 6 is a flowchart of an example of the operation of a controller of an image acquisition apparatus, according an embodiment of the disclosure.

FIG. 6 is a flowchart of an example of operation of the controller of the image acquisition apparatus, according an embodiment.

In operation S501, the controller 406 may analyse a video acquired by photographing.

When any one of events corresponds to event keywords in operation S503, the controller 406 may update a file of an event log (e.g., the event log 601 of FIG. 4) in operation S505 and may output a sound alarm through the speaker 409 in operation S507. The controller 406 may output details of a currently-occurring event as sound and may output, as sound, the number and names of files in which accumulated videos of events are stored.

In operation S509, the controller 406 may store the videos and event log files in the storage 410.

In operation S511, the controller 406 may determine whether an SSID of an access point of a specific area is detected.

When the SSID of a specific access point is not detected, the controller 406 may determine whether the remaining capacity $C_R$ of the storage 410 is less than the minimum capacity $C_L$ in operation S513. When the SSID is not detected and the remaining capacity $C_R$ of the storage 410 is less than the minimum capacity $C_L$, the controller 406 may implement an urgent backup mode in operation S515 (see FIG. 8). Then, the controller 406 may organize the storage 410 in operation S517 (see FIG. 9), and when an end signal is not generated in operation S535, the above operations may be repeatedly performed.

When the SSID of the specific access point is detected, the controller 406 may perform Wi-Fi access to the specific access point, in operation S519.

When the Wi-Fi access to the specific access point succeeds in operation S521, the controller 406 may upload all of the files stored in the storage 410 to the monitoring device 300 in operation S523.

In the present embodiment, when the user accesses a Wi-Fi zone of the specific access point, that is, a specific Wi-Fi zone, the files stored in the storage 410 may be automatically uploaded to the monitoring device 300. That is, the image acquisition apparatus 101 of the present embodiment may use the SSID of the specific access point to detect that the user accesses the location of the monitoring device 300 and may perform a file backup from a detection point in time. Therefore, the file backup may be automatically performed at an appropriate point in time that the user desires. For example, whenever police officers having worked outside come back to the police station, video files in the image acquisition apparatus 101 may be automatically backed up to the monitoring device 300. In this case, the work load of the police officers may decrease.

When the file backup is completed, the controller 406 may organize the storage 410 (S517, see FIG. 9), and when the end signal is not generated in operation S535, the above-described operations may be repeatedly performed.

Otherwise, when the Wi-Fi access to the specific access point fails in operation S521, the controller 406 may perform LTE access in operation S525.

When the LTE access fails in operation S527, the controller 406 may output a guidance message indicating an Internet connection error through the speaker 409, in operation S529. Then, when the end signal is not generated in operation S535, the controller 406 may repeatedly perform the above-described operations.

Otherwise, when the LTE access succeeds in operation S527, the controller 406 may upload the event log files stored in the storage 410 to the monitoring device 300 in operation S531 and may upload, to the monitoring device 300, video files including events from among the video files stored in the storage 410 in operation S535. When the LTE access requiring additional costs is performed, important files are transmitted by using the event log, and thus backup costs may effectively decrease.

Then, the controller 406 may organize the storage 410 (S517, see FIG. 9), and when an end signal is not generated in operation S535, the above operations may be repeatedly performed.

Figure 7:
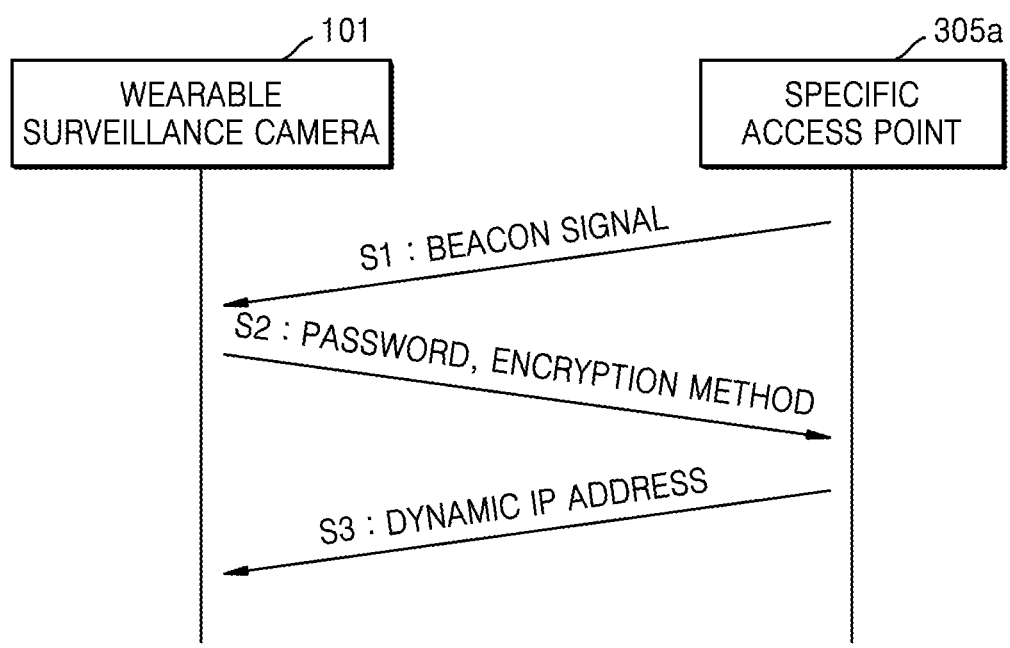
FIG. 7 is a diagram for explaining a Wi-Fi access operation of FIG. 6.

FIG. 7 is a diagram for explaining the Wi-Fi access operation S519 of FIG. 6. In operation S1, the specific access point may broadcast a beacon signal including an SSID of the specific access point.

Then, the image acquisition apparatus 101 may extract the SSID by parsing the received beacon signal. In operation S2, when the extracted SSID is the SSID of the specific access point, the image acquisition apparatus 101 may transmit passwords and an encryption method to the specific access point. As well known, examples of password encryption methods include Wi-Fi protocol access (WPA), WPA2, or wired equivalent privacy (WEP).

In operation S3, when the passwords are decrypted according to the encryption method and the decrypted passwords are authenticated, the specific access point may assign a dynamic Internet protocol (IP) address to the image acquisition apparatus 101.

Accordingly, the image acquisition apparatus 101 may perform Wi-Fi communication through the specific access point.

Figure 8:
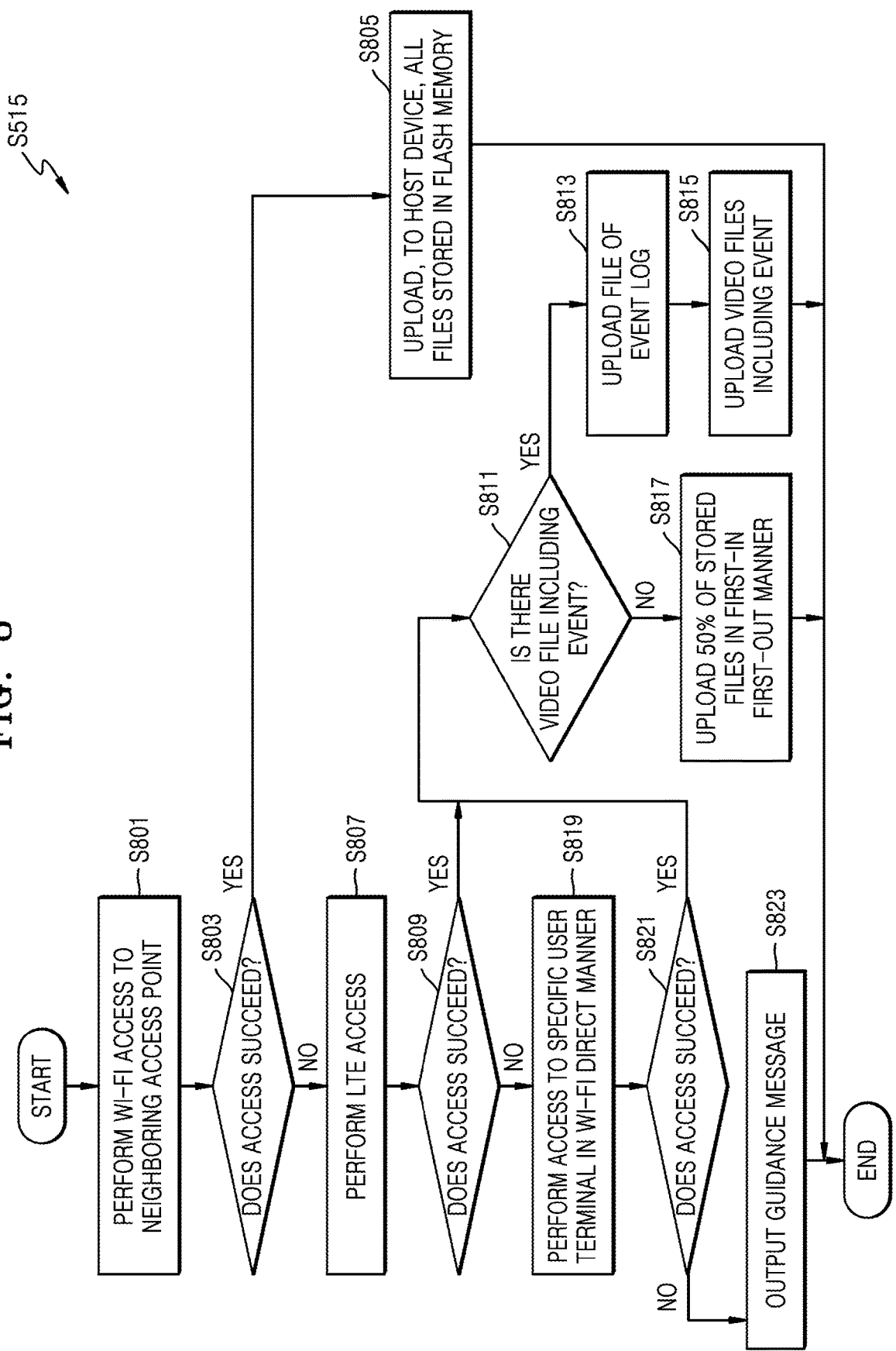
FIG. 8 is a diagram of an example of an urgent backup operation of FIG. 6.

FIG. 8 is a diagram of an example of the urgent backup operation S515 of FIG. 6.

First of all, in operation S801, the controller 406 may perform Wi-Fi access to a neighboring access point other than the specific access point.

When the Wi-Fi access to the neighboring access point succeeds in operation S803, the controller 406 may upload all of the files, which are stored in the storage 410, to the monitoring device 300 in operation S805.

Otherwise, when the Wi-Fi access to the neighboring access point fails in operation S803, the controller 406 may perform LTE access in operation S807.

When the LTE access fails in operation S809, the controller 406 may access a specific terminal in a Wi-Fi direct method in operation S819. Examples of the specific terminal may include a navigation device, a black box, a smart phone of the user, a camera of an accompanying person, and the like.

When it is impossible to access the specific terminal in the Wi-Fi direct method in operation S821, the controller 406 may output a guidance message indicating an Internet connection error through the speaker 409 in operation S823.

When the LTE access succeeds in operation S809 or when the access to the specific terminal succeeds in operation S821, the controller 406 may determine whether there are video files including events among the files stored in the storage 410, in operation S811.

When there are the video files including the events, the controller 406 may upload the event log files in operation S813 and may upload the video files including the event in operation S815. Where there are no video files including the event, the controller 406 may upload some of the files stored in the storage 410, for example, 50% of the files, in a first-in first-out manner, in operation S817. Of course, 50% may be appropriately changed. When the LTE access succeeds, the files may be uploaded to the monitoring device 300. When the access to the specific terminal succeeds, the files may be uploaded to the specific terminal.

When the LTE access succeeds, the capacity of files to be uploaded is appropriately limited, and thus, back-up costs may be effectively reduced.

When the access to the specific user terminal succeeds, a file backup may be adaptively performed even though an Internet access is not available, and thus, a problem, such as a halt of recording of the image acquisition apparatus 101 with regard to the storage capacity of the storage 410, may be prevented.

Figure 9:
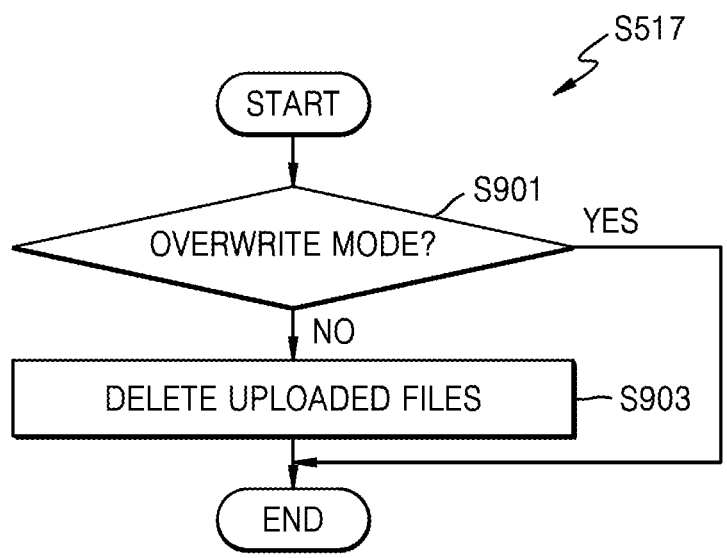
FIG. 9 shows an example of a memory organizing operation of FIG. 6.

FIG. 9 shows an example of the memory organizing operation S517 of FIG. 6.

Referring to FIG. 9, in operation S903, the controller 406 may delete the uploaded files from the storage 410 when the controller 406 is not in an overwrite mode in operation S901. In the case of the file of the event log, the file may not be deleted, and the data may only be deleted.

Figure 10:
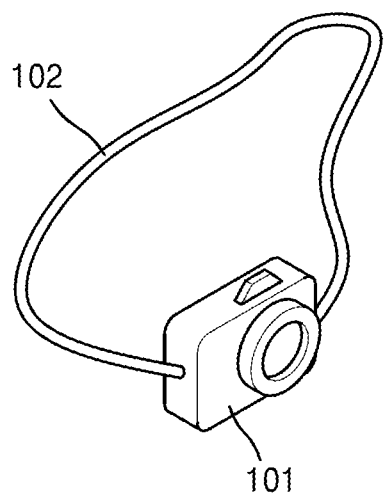
FIG. 10 shows an example of an image acquisition apparatus according to an embodiment of the disclosure.
Figure 11:
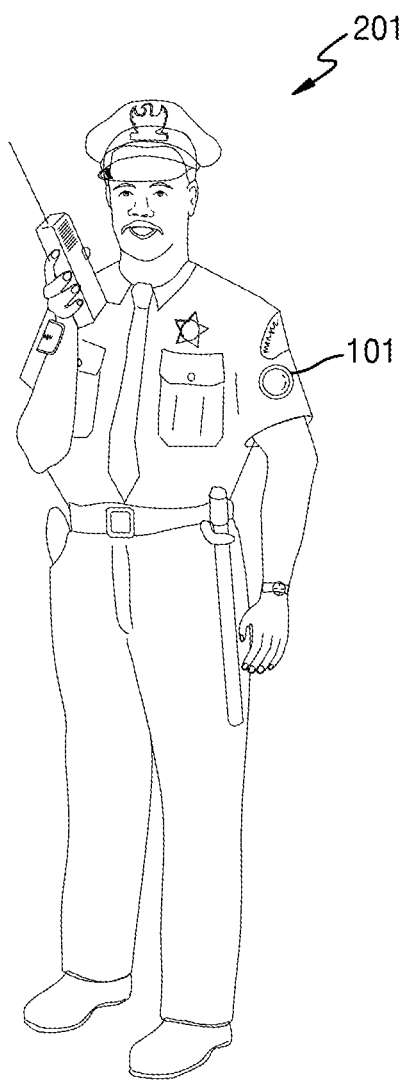
FIG. 11 shows an example in which a user wears an image acquisition apparatus of FIG. 10.

FIG. 10 shows an example of the image acquisition apparatus according to an embodiment. FIG. 11 shows an example in which the user wears the image acquisition apparatus of FIG. 10.

Referring to FIG. 10, the image acquisition apparatus 101 may be a wearable camera such as a belt/head-mounted camera, a wrist/arm-mounted camera, and a clothing-based camera. The wearable camera may include detachable means 102 that allow the user to directly or indirectly detach the wearable camera. The detachable means 102 may vary and may be, for example, a band, a strap, a badge, a button, tweezers, or the like that are detachable to a certain portion of a body part of the user, a bag, clothes, or the like.

FIG. 10 shows an example in which the wearable camera 101 is worn by a user 201 by using a strap as the detachable means 102. In the present embodiment, the user 201 is a police officer.

The wearable camera 101 may store the SSID of the specific access point and may store, in a memory, files of a video acquired by photographing. When the SSID is detected, the wearable camera 101 may upload, to the monitoring device 300, the files stored in the memory through the specific access point.

When the user 201 accesses the Wi-Fi zone of the specific access point, that is, a specific Wi-Fi zone, the files stored in the flash memory may be automatically uploaded to the monitoring device 300 by using the wearable camera 101 according to the present embodiment. That is, the wearable camera 101 according to the present embodiment detects that the user 201 accesses the location of the monitoring device 300 by using the SSID of the specific access point and performs the file backup from the detection point in time.

Therefore, the file backup may be automatically performed at an appropriate point in time that the user 201 desires. For example, whenever police officers, who have worked outside, come back to the police station, the files of the video in the wearable camera 101 may be automatically backed up to the monitoring device 300. In this case, the work load of the police officers may decrease.

As described above, according to the image acquisition apparatus, when the user accesses the Wi-Fi zone of the specific access point, that is, the specific Wi-Fi zone, the files stored in the storage may be automatically uploaded to the monitoring device.

While this disclosure has been particularly shown and described with reference to embodiments thereof, it will be understood by one of ordinary skill in the art that various changes in form and details may be made therein without departing from the spirit and scope of the disclosure as defined by the appended claims. The embodiments should be considered in descriptive sense only and not for purposes of limitation. Therefore, the scope of the disclosure is defined not by the detailed description of the disclosure but by the appended claims, and all differences within the scope will be construed as being included in the disclosure.

The invention claimed is:

1. An image acquisition apparatus comprising:
a sensor unit configured to generate a detection signal;
a log generator configured to detect an event corresponding to a keyword that is set in response to the detection signal and generate a log file regarding the event;
a storage configured to store the detection signal and the log file; and
a mode controller configured to, when the image acquisition apparatus accesses a specific area, select a network according to a priority that is set for at least one accessible network, and upload, to an external device, data comprising at least one of the detection signal and the log file through the selected network,
wherein, when a plurality of network access devices are retrieved from the selected network, the mode controller is further configured to access a first network access device corresponding to a registered identifier, and
wherein, when the first network access device is not retrieved and a remaining capacity of the storage is less than a minimum capacity, the mode controller is further configured to access the plurality of access devices except the first network access device, based on signal intensity.

2. The image acquisition apparatus of claim 1, wherein the detection signal comprises a sound signal and an image signal.

3. The image acquisition apparatus of claim 1, wherein the mode controller is further configured to differently set the data to be uploaded according to the priority of the network.

4. The image acquisition apparatus of claim 1, wherein the mode controller is further configured to differently set upload capacity of the data stored in the storage, according to the priority of the network.

5. The image acquisition apparatus of claim 1, wherein a first priority network is a Wireless Fidelity (Wi-Fi) network, and
a second priority network is a Long Term Evolution (LTE) network.

6. The image acquisition apparatus of claim 5, wherein, when the access to the first priority network and the second priority network fails, the mode controller is configured to perform a direct wireless access to another device.

7. The image acquisition apparatus of claim 6, wherein the other device comprises a device connected to the first priority network or the second priority network.

8. A method of driving an image acquisition apparatus, the method comprising:
generating a detection signal;
detecting an event corresponding to a keyword that is set in response to the detection signal and generating a log file regarding the event;
storing the detection signal and the log file; and
uploading, to an external device, data comprising at least one of the detection signal and the log file through a network that is selected according to a priority that is set for at least one accessible network when the image acquisition apparatus accesses a specific area, wherein, when a plurality of network access devices are retrieved from the selected network, the uploading comprises accessing a first network access device corresponding to a registered identifier, and wherein, when the first network access device is not retrieved and a remaining capacity of a storage for the storing is less than a minimum capacity, the uploading comprises accessing one of the plurality of access devices except first network access device, base on signal intensity.

9. The method of claim 8, wherein the detection signal comprises a sound signal and an image signal.

10. The method of claim 8, wherein the data to be uploaded comprises pieces that are different according to the priority of the network.

11. The method of claim 8, wherein a capacity of the data to be uploaded is different according to the priority of the network.

12. The method of claim 8, wherein a first priority network is a Wireless Fidelity (Wi-Fi) network, and a second priority network is a Long Term Evolution (LTE) network.

13. The method of claim 12, wherein, when the access to the first priority network and the second priority network fails, the uploading comprises a direct wireless access to another device.

14. The method of claim 13, wherein the other devices comprise devices connected to the first priority network or the second priority network.

* * * * *